United States Patent
Dill et al.

(10) Patent No.: US 7,887,191 B2
(45) Date of Patent: Feb. 15, 2011

(54) METHOD AND SYSTEM FOR MAKING A LARGE OBJECT ITILIZING LASER PROJECTION

(75) Inventors: William J. Dill, Clinton, WA (US); Paul E. Jennerjohn, Sammamish, WA (US); Paul G. Solecki, Bothell, WA (US); Reynold R. Panergo, Auburn, WA (US); James C. Vanavery, Renton, WA (US); Lindsey M. Caton, Edmonds, WA (US); Pamela J. Manzer, Everett, WA (US); David A. Lindley, Arlington, WA (US)

(73) Assignee: The Boeing Company, Chicago, IL (US)

( * ) Notice: Subject to any disclaimer, the term of this patent is extended or adjusted under 35 U.S.C. 154(b) by 453 days.

(21) Appl. No.: 12/024,853

(22) Filed: Feb. 1, 2008

(65) Prior Publication Data

US 2009/0195753 A1 Aug. 6, 2009

(51) Int. Cl.
*G03B 21/14* (2006.01)
(52) U.S. Cl. .............................. 353/28; 353/30; 353/121
(58) Field of Classification Search ................... 353/28, 353/30, 121
See application file for complete search history.

(56) References Cited

U.S. PATENT DOCUMENTS

| | | | | |
|---|---|---|---|---|
| 5,425,179 A | * | 6/1995 | Nickel et al. | 33/366.16 |
| 2002/0008697 A1 | | 1/2002 | Deering | 345/418 |
| 2002/0024640 A1 | | 2/2002 | Ioka | 353/94 |
| 2003/0198374 A1 | * | 10/2003 | Hagene et al. | 382/141 |
| 2005/0082262 A1 | * | 4/2005 | Rueb et al. | 219/121.6 |
| 2005/0121422 A1 | | 6/2005 | Morden et al. | 219/121.6 |

FOREIGN PATENT DOCUMENTS

EP 1719580 11/2006

OTHER PUBLICATIONS

Office Action + Translation, Appln. No. 200810149433.8, dated Mar. 11, 2010, (11 pgs).
Office Action filed in U.S. Appl. No. 12/024,825 dated Jun. 11, 2010, 10 pages.
Canadian Official Action dated Jun. 3, 2010, 6 pages.

* cited by examiner

*Primary Examiner*—Seung C Sohn
(74) *Attorney, Agent, or Firm*—Hayes Soloway P.C.

(57) ABSTRACT

The system contains a plurality of laser projectors. An image of a marking is projected in a synchronized form by the plurality of laser projectors. A computer network provides communication with the laser projectors. A central workstation communicates with the laser projectors through the computer network. The central workstation coordinates the image projected by the laser projectors.

20 Claims, 8 Drawing Sheets

METHOD AND SYSTEM FOR MAKING A LARGE OBJECT ITILIZING LASER PROJECTION

The present disclosure is generally related to laser projection and, more particularly, is related to a laser projector system for marking company liveries on large-scale vehicle surfaces. The invention has particular utility for use with an aircraft and will be described in connection with such utility, although other utilities are contemplated.

Large-scale vehicles, such as airplanes, may be provided with customer liveries during the manufacturing process. The liveries may include one or more logos of the vehicle as well as identifying indicia for the vehicle. The liveries may be formed using one or more colors.

Presently, custom Mylar tools are constructed to enable the application of liveries to large-scale vehicles. Mylar tools are expensive to build and maintain. Typically, these Mylar tools are hand made for every paint design. Changes to a design generally require a new hand built set of tools. Once the set of Mylar tools are made, testing is done to insure proper fit and function. The building and testing is performed on the vehicle in final assembly after substantial completion of vehicle construction. Thus, the building and testing requires access to the vehicle and may require dangerous positioning of tooling personnel (as liveries are regularly positioned in locations that require staging or other structures or support to access). It is not unusual for a Mylar tool set for a decorative layout to be constructed over a thirty-day schedule. Flaws found in testing may require another thirty-day schedule to complete a revised Mylar tool set. Also, the Mylar tool set may be crafted to the specifications of the vehicle and as-built irregularities in a surface of the vehicle may require reconstruction of the Mylar tool set.

Therefore, it would be advantageous to have a method and apparatus that overcomes the problems discussed above.

Embodiments of the present disclosure provide a system and method for laser projection marking on a large object. Briefly described, in architecture, one embodiment of the system, among others, can be implemented as follows. The system contains a plurality of laser projectors. An image of a marking is projected in a synchronized form by the plurality of laser projectors. A computer network provides communication with the laser projectors. A central workstation communicates with the laser projectors through the computer network. The central workstation coordinates the image projected by the laser projectors.

The present disclosure can also be viewed as providing methods for laser projection marking on a large object. In this regard, one embodiment of such a method, among others, can be broadly summarized by the following steps: calibrating a plurality of laser projectors about the object; communicating an image to the plurality of laser projectors from a central workstation through a computer network; and projecting the image onto the object with the plurality of laser projectors.

Other systems, methods, features, and advantages of the present disclosure will be or become apparent to one with skill in the art upon examination of the following drawings and detailed description. The features, functions and advantages that have been discussed can be achieved independently in various embodiments of the present disclosure or may be combined in yet other embodiments further details of which can be seen with reference to the following description and drawings.

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

Figure 1:
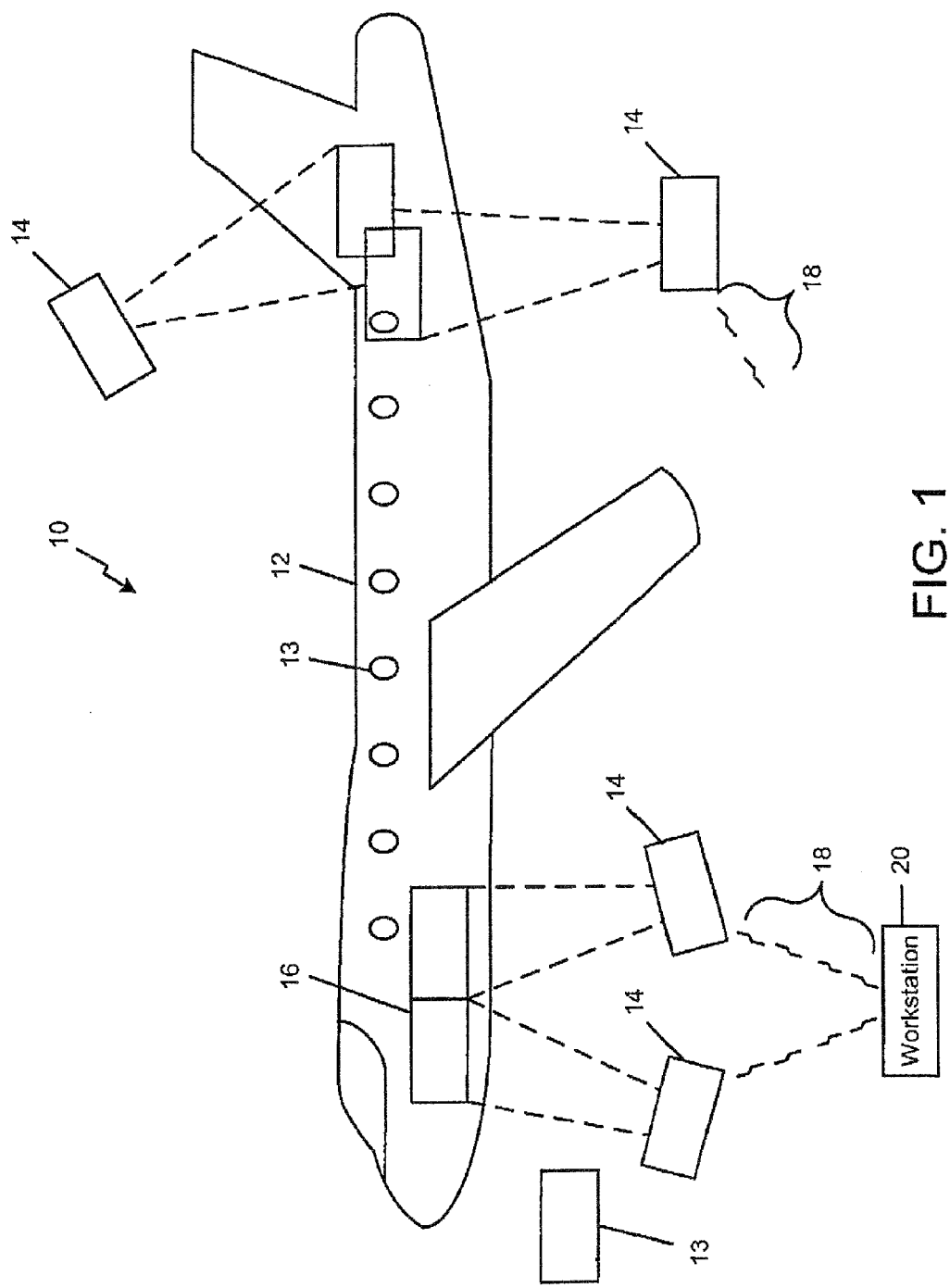
FIG. 1 is an illustration of a system for laser projection marking on a large object, in accordance with one embodiment of the present disclosure.

FIG. 1 is an illustration of a system 10 for laser projection marking on a large object 12, in accordance with a first exemplary embodiment of the present disclosure. The system 10 contains a plurality of laser projectors 14. An image 16 of a marking is projected in a synchronized form by the plurality of laser projectors 14. A computer network 18 provides communication with the laser projectors 14. A central workstation 20 communicates with the laser projectors 14 through the computer network 18. The central workstation 20 coordinates the image 16 projected by the laser projectors 14.

The large object 12 may be, as shown in FIG. 1, an aircraft, although other similarly sized objects may utilize the embodiments disclosed herein. The laser projectors 14, properly coordinated, allow marking the large object 12 in many different locations concurrently in a manner that would not be feasible with a single laser projector. Thus, work may be performed concurrently along the entire large object 12 to paint and/or otherwise mark the large object 12. Painting may be performed from a paint booth 13 proximate to at least one of the images 16 projected on the large object 12.

The image 16, while including the marking to be applied to the large object 12, may also include physical features found on the large object 12, such as windows 13. Providing features of the large object 12 in the image 16 may assist in the transformation of the image along the large object 12. Assisting in transformation will improve the proper marking of the large object 12.

As shown in FIG. 1, the laser projectors 14 may be in wireless communication with the central workstation 20 via a computer network 18. The central workstation 20 may be in communication with a transmitter that is part of the computer network 18. The central workstation 20 transmits through the transmitter a wireless signal to the laser projectors 14 to coordinate display of the image 16 on the large object 12. The computer network 18 and the central workstation 20 may include devices known to those having ordinary skill in the art for generation and communication of signals to output devices, such as laser projectors 14. The central workstation 20 may further divide the image 16 into a plurality of portions of the image 16 such that each laser projector 14 projects a portion of the image 16 and the sum of the projected portions of the image 16 is the whole image 16. Further, the portions of the image 16 projected may overlap and, in some cases, overlap significantly to insure proper projection of the image 16.

Figure 2:
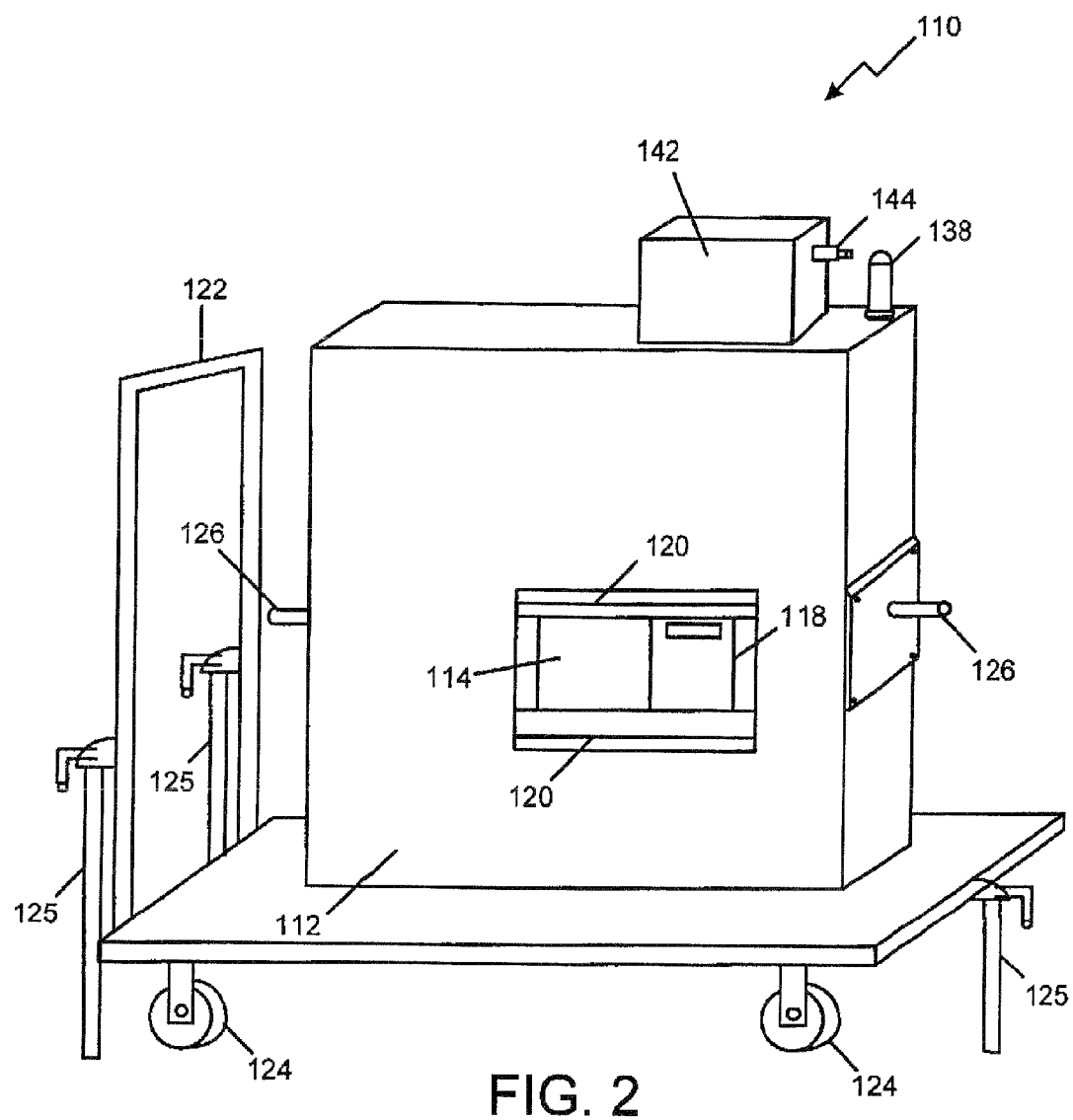
FIG. 2 is a perspective illustration of an individual system for laser projection marking on a large object, in accordance with the present disclosure.

FIG. 2 is a perspective illustration of an individual laser projector 14 marking on a large object 12, in accordance with the present disclosure. The projector 14 is contained within a cart system 110 which contains a purge chamber 112 such as described in co-pending U.S. application Ser. No. 12/024,825, filed Feb. 1, 2008 assigned to the common Assignee. A substantially optically transparent wall 114 is formed along the purge chamber 112. A laser projector 116 is mounted within the purge chamber 112. The laser projector 14 (shown in FIG. 5) is positioned to project a laser beam through the substantially optically transparent wall 114.

The purge chamber 112 maintains an environment within the purge chamber 112 that allows for safe operation of the laser projector 14. The purge chamber 112 may be connected to one or more conduits that transmit one or more gasses into and out of the purge chamber 112. The purge chamber 112 may have one or more monitors housed therein that monitor the environment within the purge chamber 112 for the presence of hazardous or explosive gasses. The purge chamber 112 may include a device for communicating to a user the presence of hazardous or explosive gasses in the environment within the purge chamber 112 and/or automatically terminating operation of the laser projector 14 upon indication of the presence of hazardous or explosive gasses.

The substantially optically transparent wall 114 forms a window that allows the laser projector 14 to project a line, image, or other projection out of the purge chamber 112. The substantially optically transparent wall 114 may be designed of a material that allows at least partial passage of the radiation emitted from the laser projector 14. Thus, for example, if the laser projector projects a non-visible wavelength of radiation, the substantially optically transparent wall 114 need only allow transmission of that non-visible wavelength of radiation, although the substantially optically transparent wall 114 may allow transmission of a broad band of radiation wavelengths.

The laser projector 14 may be any device known in the industry for transmitting one or more beams of radiation. The laser projector 14 may include hardware and software for accurately projecting images onto uneven, three dimensional objects.

Figure 3:
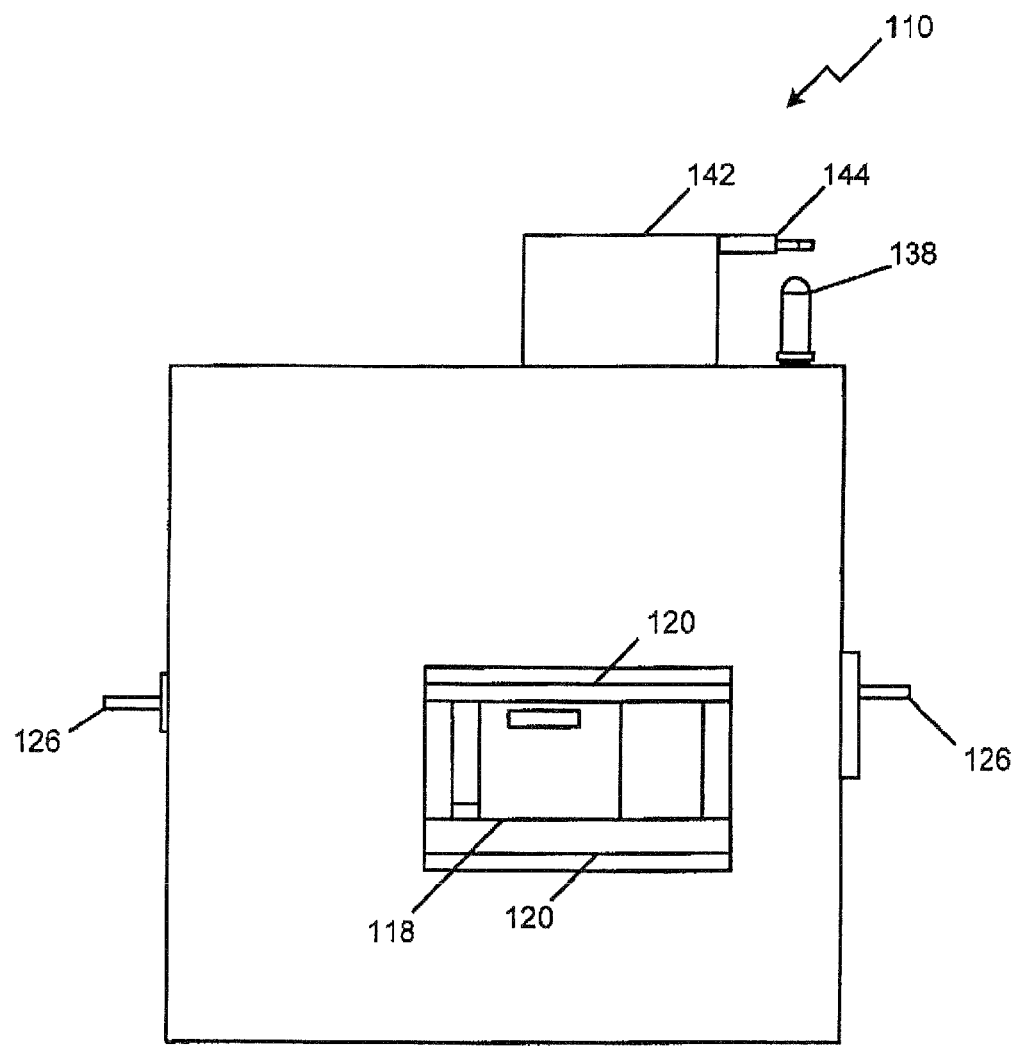
FIG. 3 is a front illustration of the system shown in FIG. 2.

FIG. 3 is a front illustration of the system 110 for laser projection marking on a large object 12 shown in FIG. 1, in accordance with the present disclosure. The system 110 includes a protective wall 118 movable between a first position (shown in FIG. 3) and a second position (shown in FIG. 2), wherein the first position substantially overlaps the substantially optically transparent wall 114 and the second position substantially reveals the substantially optically transparent wall 114. As the system 110 is intended for operation in hazardous sites having heavy machinery and/or painting that could harm or frustrate the purpose of the substantially optically transparent wall 114, the protective wall 118 may be utilized when practical to protect the substantially optically transparent wall 114.

The system 110 includes a cart 122 (shown in FIG. 2) having a plurality of wheels 124, wherein the purge chamber 112 is mounted to the cart 122. The cart 122 allows the purge chamber 112 to be rolled to various locations for use of the laser projector 14.

The system 110 includes at least one pivot pin 126 mounted to an exterior surface of the purge chamber 112. As shown in FIG. 3, the purge chamber 112 may have pivot pins 126 on opposing sides of the purge chamber 112. When mounted on the pivot pins 126, the purge chamber 112 may be rotated, for instance, ninety degrees on the pivot pins 126. Providing the opportunity to rotate the purge chamber 112, provides an opportunity to rotate the laser projector 14 and project images at various angles. The pivot pins 126 may also be used to pick up the purge chamber 112 with a forklift. Not shown, at least one fork pocket may be formed in the purge chamber 112. The fork pocket may be sized to receive a fork of a forklift, allowing the purge chamber 112 to be lifted with the forklift.

The system 110 includes a wireless communications device 136 mounted within the purge chamber 112 and wired to the laser projector 14. The wireless communications device 136 allows communications to the laser projector 14 through the purge chamber 112. As shown in FIG. 3, the system 110 may include an antenna 138 mounted to the purge chamber 112 at least partially exterior to the purge chamber 112. The antenna 138 is in communication with the wireless communications device 136 and may provide enhanced transmission of a signal from the wireless communications device 136. The wireless communications device 136 and antenna 138 may be commercially available wireless communications products. The wireless communications device 136 may be integral with antenna 138. The wireless communications device 136 may, for instance, be used to transmit images to the laser projector 14 for projection.

Figure 4:
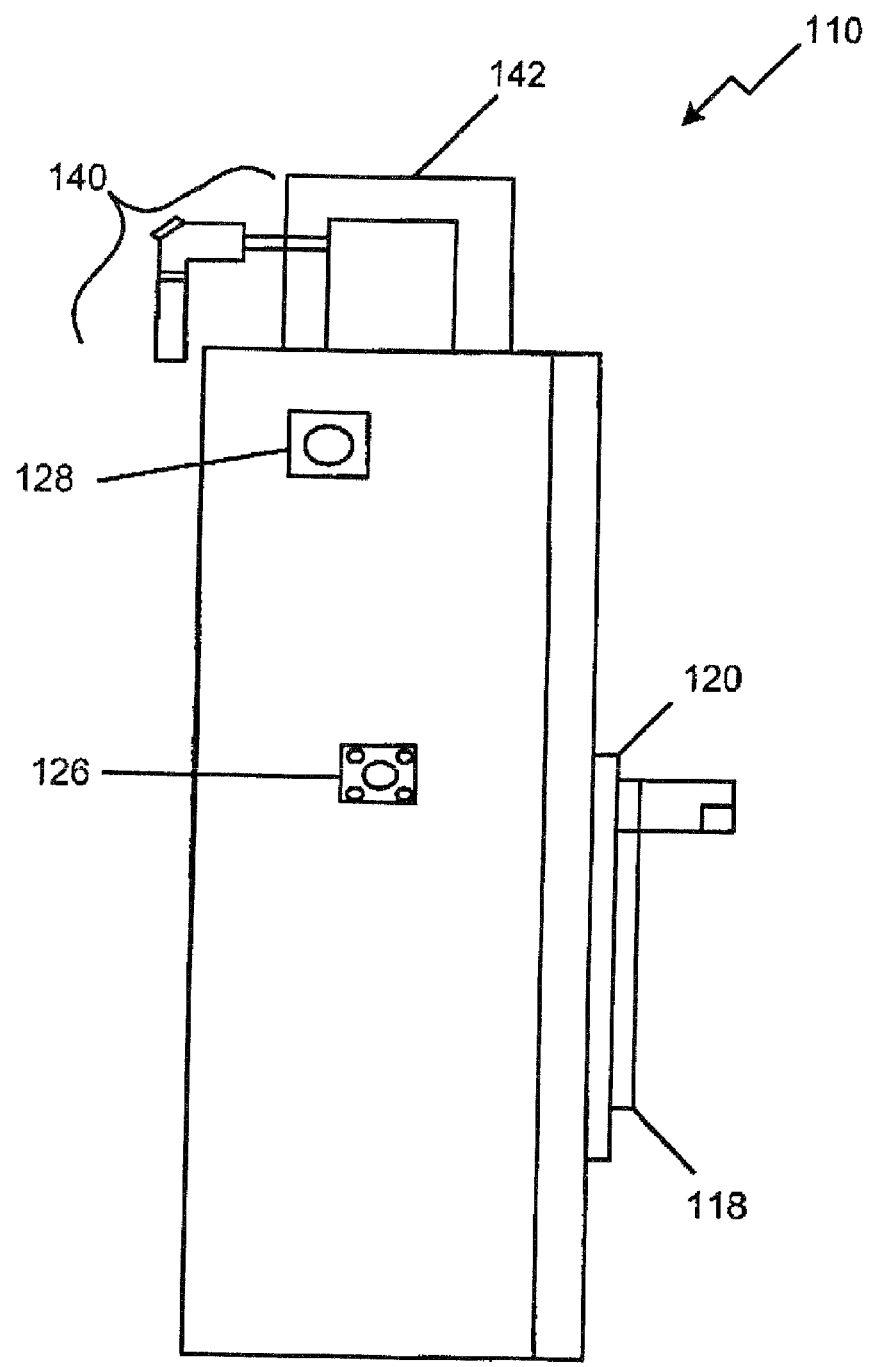
FIG. 4 is a side illustration of the system shown in FIG. 2.

FIG. 4 is a side illustration of the system 110 for laser projection marking on a large object 12 shown in FIG. 1, in accordance with the present disclosure. A conduit 140 is connected to the purge chamber 112 for gas transmission. The conduit 140 is shown connected to the purge chamber 112 through a purge controller 142 mounted to the purge chamber 112. The purge controller 142 controls gas transmission through the conduit 140. The purge controller 142 may also have a release valve 144 (FIG. 5) mounted thereto. The release valve 144 may be operated to release an excess of gas pressure within the purge chamber 112.

Figure 5:
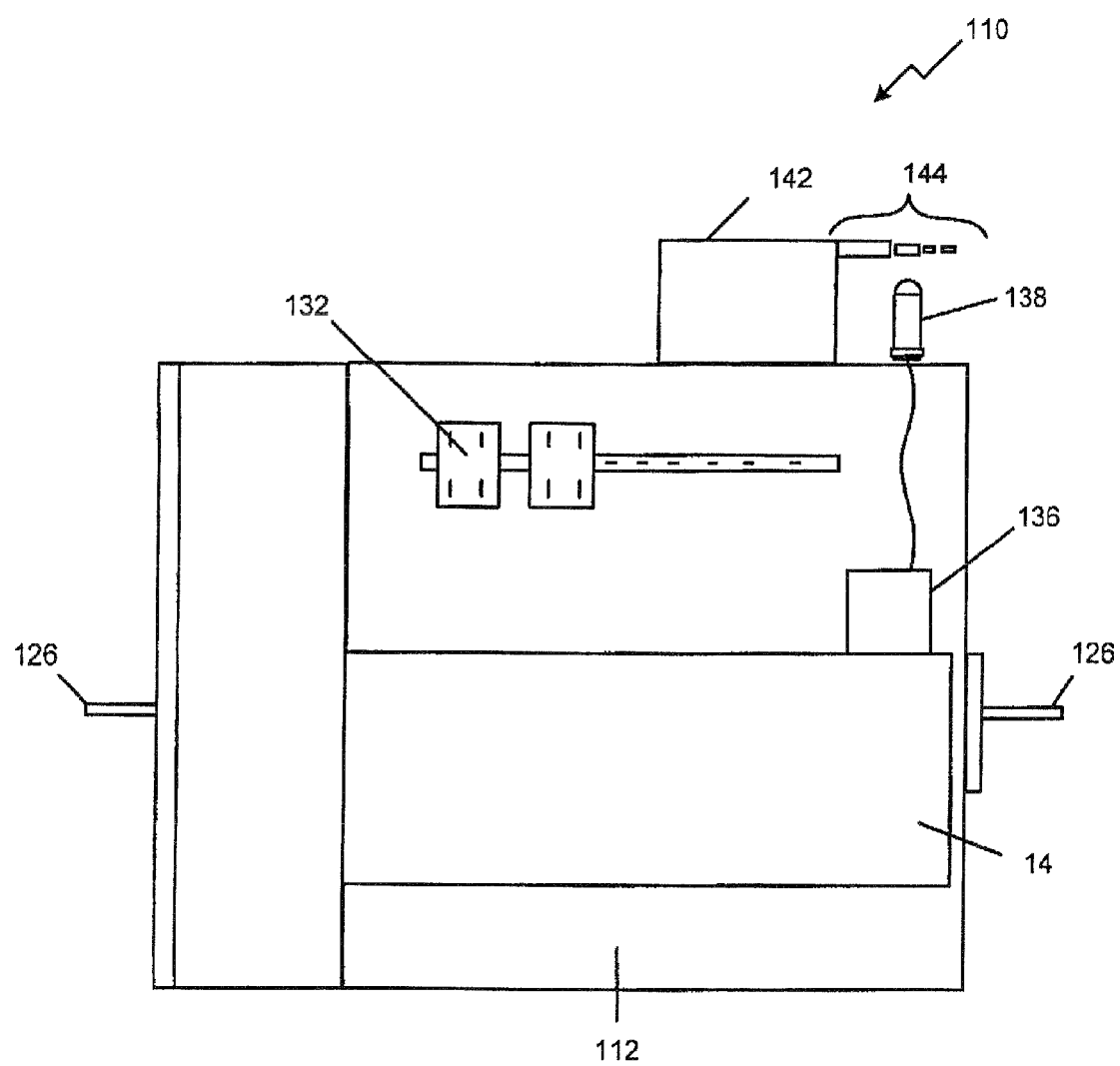
FIG. 5 is an interior illustration of the system shown in FIG. 2.

FIG. 5 is an interior illustration of the system 110 for laser projection marking on a large object 12 shown in FIG. 1, in accordance with the present disclosure. As shown in FIG. 5, a power strip 132 may be mounted within the purge chamber 112 for connection to the laser projector 14. The illustrated embodiment also shows devices for wireless communication to the laser projector 14 and, while both devices may be provided, it may be more likely that either wired or wireless communication to the laser projector 14 be provided.

Figure 6:
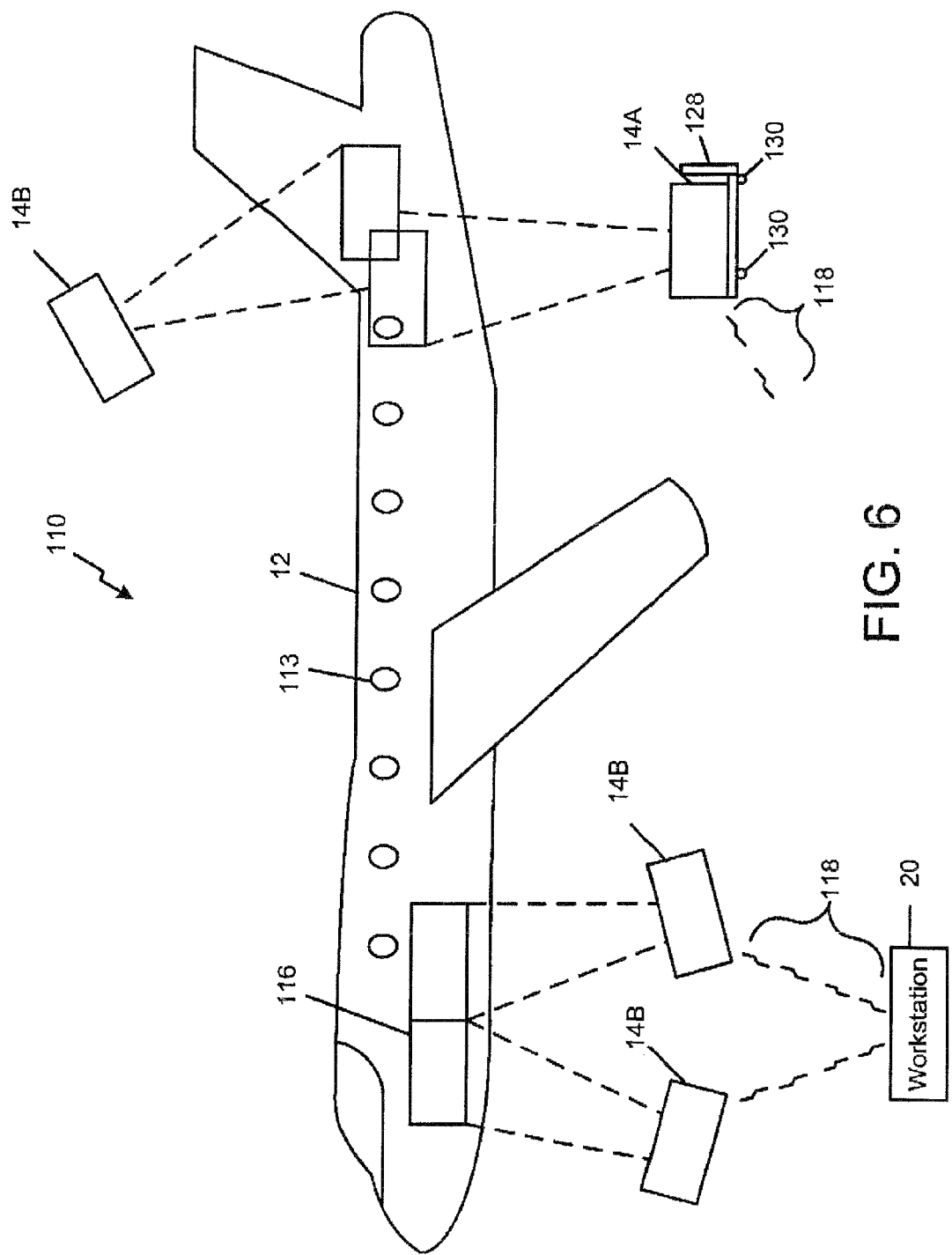
FIG. 6 is an illustration of a system for laser projection marking on a large object, in accordance with the second exemplary embodiment of the present disclosure.

FIG. 6 is an illustration of the system 110 for laser projection marking on a large object 12, in accordance with a first exemplary embodiment of the present disclosure. The system 110 contains a plurality of laser projectors 14A, 14B. An image 116 of a marking is projected in a synchronized form by the plurality of laser projectors 14A, 14B. A computer network 118 provides communication with the laser projectors 14A, 14B. A central workstation 20 communicates with the laser projectors 14A, 14B through the computer network 118. The central workstation 20 coordinates the image 116 projected by the laser projectors 14A, 14B.

As shown in FIG. 6, the laser projectors include both mobile laser projectors 14A and stationary laser projectors 14B. For repeated marking/manufacture of similar large objects 12, stationary laser projectors 14B may be convenient in that transformation of the image 116 may be easier and more reliable. However, some markings may be required in locations that are not convenient for stationary laser projectors 14B and, for those markings, mobile laser projectors 14A may be useful. The system 110 may be conveniently adopted with between 3 and approximately 30 or more laser projectors 14A, 14B in which a percentage, e.g., approximately twenty percent of the laser projectors are mobile laser projectors 14A, and the balance, approximately eighty percent of the laser projectors are stationary laser projectors 14B. Further, for a larger number of laser projectors, it may be useful to adopt more than one central workstation 20.

Figure 7:
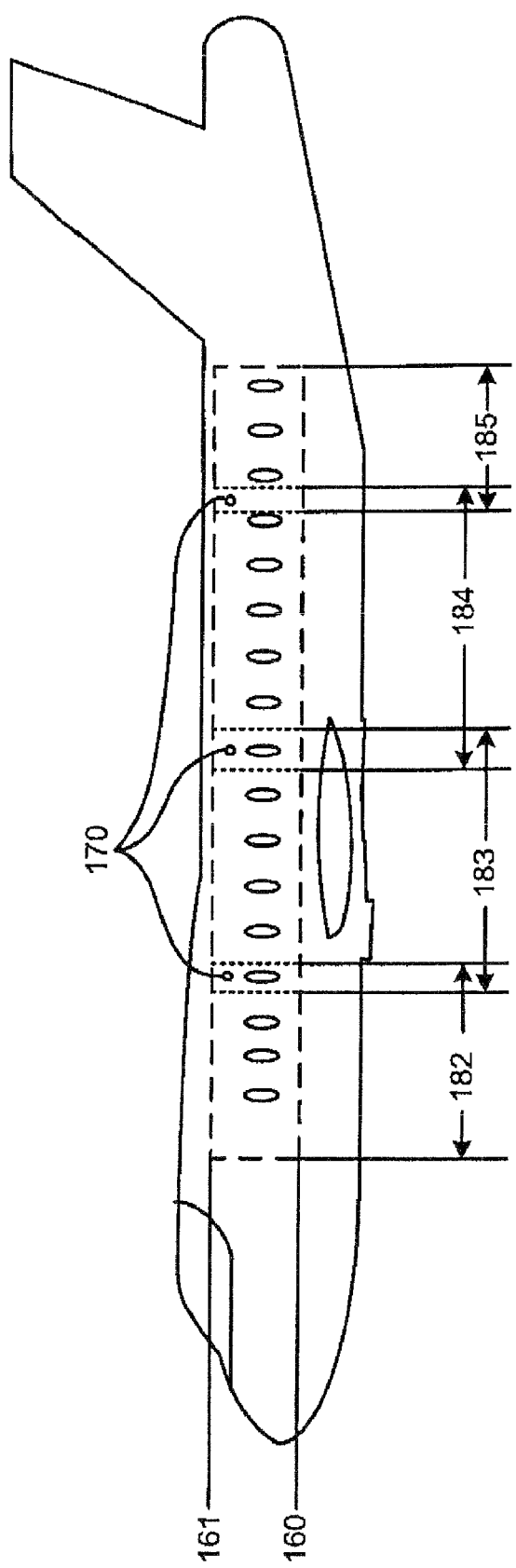
FIG. 7 is an illustration showing the alignment of images projected by the system for laser projection marking on a large object, in accordance with the second exemplary embodiment of the present disclosure.

FIG. 7 is an illustration showing the alignment of images projected by stationary laser projectors 14B. The images 182, 183, 184, 185 overlap at predetermined points on the large object. These points may be marked using small retro-reflective surfaces 170 to ensure that all stationary laser projectors work as a single system.

Figure 8:
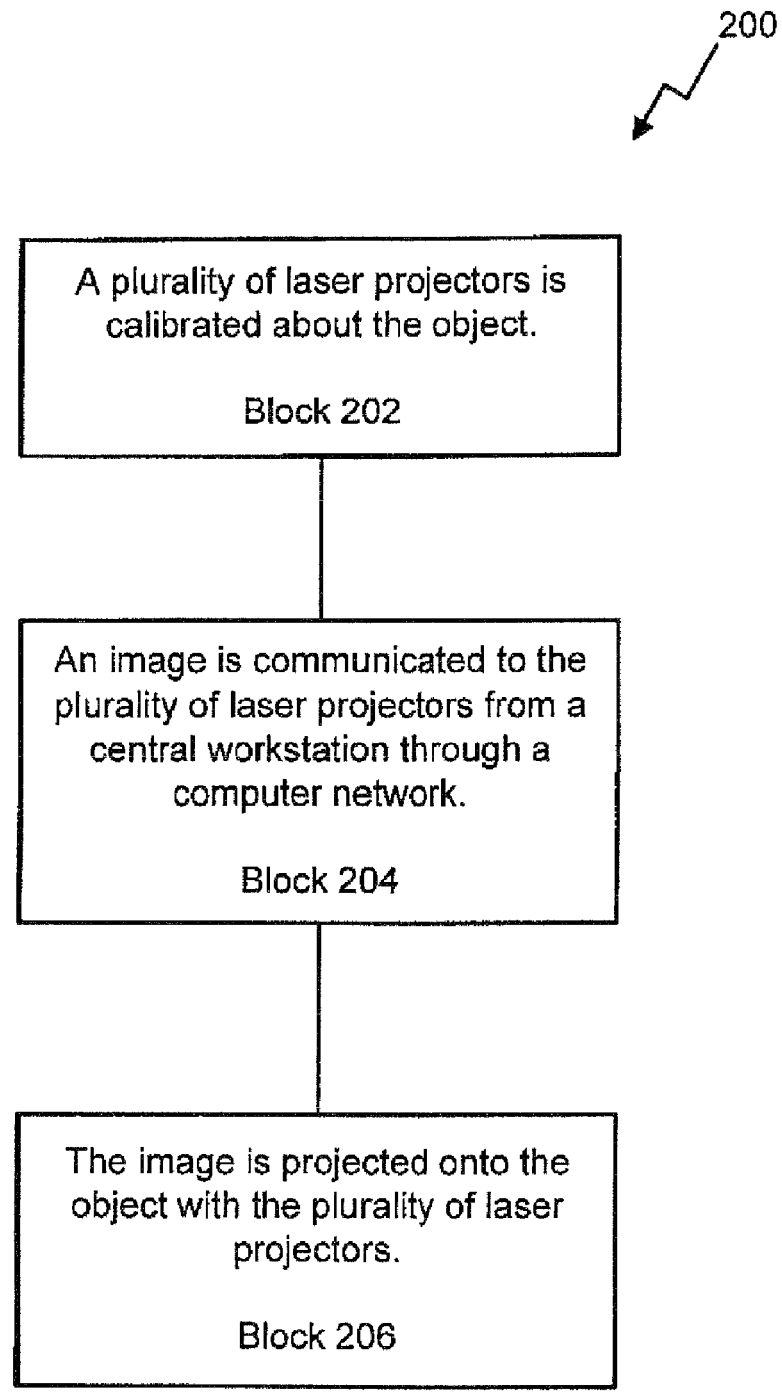
FIG. 8 is a flowchart illustrating a method of providing the abovementioned system for laser projection marking on a large object, in accordance with the present disclosure.

FIG. 8 is a flowchart 200 illustrating a method of providing the abovementioned system 10 for laser projection marking on a large object 12, in accordance with the above described exemplary embodiment. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved.

As is shown by block 202, a plurality of laser projectors 14 is calibrated about the object 12. An image 16 is communicated to the plurality of laser projectors 14 from a central workstation 20 through a computer network 18 (block 204). The image 16 is projected onto the object 12 with the plurality of laser projectors 14 (block 206).

It should be emphasized that the above-described embodiments of the present disclosure, particularly, any "preferred" embodiments, are merely possible examples of implementations, merely set forth for a clear understanding of the principles of the present disclosure. Many variations and modifications may be made to the above-described embodiments without departing substantially from the spirit and principles of the disclosure. All such modifications and variations are intended to be included herein within the scope of this disclosure and protected by the following claims.

What is claimed is:

1. An apparatus for laser projection marking on a vehicle exterior, the apparatus comprising:
   a plurality of laser projectors;
   an image of the vehicle exterior projected in a synchronized form by the plurality of laser projectors;
   a computer network in communication with the laser projectors; and
   a central workstation in communication with the laser projectors through the computer network, whereby the central workstation coordinates the image projected by the laser projectors.

2. The apparatus of claim 1, further comprising a plurality of purge chambers, each purge chamber having a substantially optically transparent wall formed along the purge chamber, wherein each laser projector is mounted within one of the purge chambers and positioned to project a laser beam through the substantially optically transparent wall.

3. The apparatus of claim 2, further comprising at least one cart having a plurality of wheels, wherein one of the purge chambers is mounted to the cart.

4. The apparatus of claim 1, wherein the communication between the computer network and the laser projectors is wireless.

5. The apparatus of claim 1, wherein the plurality of laser projectors further comprises a plurality of stationary laser projectors and a plurality of mobile laser projectors, and wherein each of the mobile laser projectors is mounted to a cart.

6. The apparatus of claim 1, wherein the plurality of laser projectors further comprises between 3 and 30 laser projectors.

7. The apparatus of claim 1, further comprising a plurality of central workstations in communication with the laser projectors through the computer network, whereby the central workstations coordinate the image projected by the laser projectors.

8. The apparatus of claim 1, wherein the laser projectors project a plurality of portions of the image.

9. The apparatus of claim 8, wherein the portions of the image overlap as projected by the laser projectors.

10. The apparatus of claim 8, wherein the portions of the image combine to form the image.

11. A method for laser marking on a large object, the method comprising the steps of:
    calibrating a plurality of laser projectors about the object;
    communicating an image to the plurality of laser projectors from a central workstation through a computer network; and
    projecting the image onto the object with the plurality of laser projectors.

12. The method of claim 11, further comprising:
    mounting at least one of the laser projectors within a purge chamber; and
    positioning the laser projector to project a laser beam through a substantially optically transparent wall of the purge chamber.

13. The method of claim 12, further comprising operating a paint booth proximate to the image projected on the object.

14. The method of claim 12, further comprising mounting the purge chamber on a cart.

15. The method of claim 11, further comprising mounting at least a portion of the plurality of laser projectors in stationary positions.

16. The method of claim 11, further comprising including characteristics of the large object in the image, thereby aiding in a transformation of the image along the large object.

17. The method of claim 11, wherein the step of projecting the image further comprises each laser projector projecting one of a plurality of portions of the image, whereby the portions of the image combine to form the image.

18. An apparatus for laser projection in an explosive environment, the apparatus comprising:
    a purge chamber;
    a substantially optically transparent wall formed along the purge chamber;
    a plurality of laser projectors, each laser projector mounted within one of a plurality of purge chambers, each laser projector positioned to project a laser beam through the substantially optically transparent wall; and
    one of a plurality of portions of an image projected by each of the laser projectors, wherein the portions of the image combine to form the image.

19. The apparatus of claim 18, wherein the plurality of portions of the image overlap.

20. The apparatus of claim 18, further comprising a central workstation in communication with the laser projectors through a computer network, whereby the central workstation coordinates the image projected by the laser projectors.

* * * * *

UNITED STATES PATENT AND TRADEMARK OFFICE
CERTIFICATE OF CORRECTION

PATENT NO. : 7,887,191 B2  
APPLICATION NO. : 12/024853  
DATED : February 15, 2011  
INVENTOR(S) : William J. Dill et al.

Page 1 of 1

It is certified that error appears in the above-identified patent and that said Letters Patent is hereby corrected as shown below:

Title Page, Item (54) Title: "METHOD AND SYSTEM FOR MAKING A LARGE OBJECT ITILIZING LASER PROJECTION" should read, "METHOD AND SYSTEM FOR MARKING A LARGE OBJECT UTILIZING LASER PROJECTION"

Signed and Sealed this  
Twenty-third Day of August, 2011

David J. Kappos  
*Director of the United States Patent and Trademark Office*

UNITED STATES PATENT AND TRADEMARK OFFICE
CERTIFICATE OF CORRECTION

Page 1 of 1

PATENT NO. : 7,887,191 B2
APPLICATION NO. : 12/024853
DATED : February 15, 2011
INVENTOR(S) : William J. Dill et al.

It is certified that error appears in the above-identified patent and that said Letters Patent is hereby corrected as shown below:

Title Page, Item (54) and at Column 1, lines 1-3, Title: "METHOD AND SYSTEM FOR MAKING A LARGE OBJECT ITILIZING LASER PROJECTION" should read, "METHOD AND SYSTEM FOR MARKING A LARGE OBJECT UTILIZING LASER PROJECTION"

This certificate supersedes the Certificate of Correction issued August 23, 2011.

Signed and Sealed this
Thirteenth Day of September, 2011

David J. Kappos
*Director of the United States Patent and Trademark Office*